(12) United States Patent
Pouyau et al.

(10) Patent No.: US 11,255,295 B2
(45) Date of Patent: Feb. 22, 2022

(54) PROPULSION ASSEMBLY COMPRISING A DUCT FOR FEEDING THE GAS GENERATOR IN AN INTER-DUCT CASING

(71) Applicant: Safran Aircraft Engines, Paris (FR)

(72) Inventors: Guillaume Rodolphe Jacques Gerard Pouyau, Paris (FR); Gabriela Philippart, Paris (FR); Christian Sylvain Vessot, Paris (FR); Marc Patrick Tesniere, Champcueil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 796 days.

(21) Appl. No.: 15/785,953

(22) Filed: Oct. 17, 2017

(65) Prior Publication Data

US 2018/0135557 A1 May 17, 2018

(30) Foreign Application Priority Data

Oct. 18, 2016 (FR) ..................................... 1660099

(51) Int. Cl.
| | |
|---|---|
| *F02K 3/06* | (2006.01) |
| *F02C 7/042* | (2006.01) |
| *F04D 29/36* | (2006.01) |
| *F01D 9/06* | (2006.01) |
| *B64D 33/02* | (2006.01) |
| *F02K 1/66* | (2006.01) |
| *F02K 3/075* | (2006.01) |
| *B64D 27/16* | (2006.01) |

(52) U.S. Cl.
CPC ................ *F02K 3/06* (2013.01); *B64D 33/02* (2013.01); *F01D 9/065* (2013.01); *F02C 7/042* (2013.01);
(Continued)

(58) Field of Classification Search
CPC ... F02K 3/06; F02K 1/66; F02K 3/075; F02K 1/28; F02K 1/64; B64D 33/02;
(Continued)

(56) References Cited

U.S. PATENT DOCUMENTS

| | | | |
|---|---|---|---|
| 3,476,486 A | | 11/1969 | Davies et al. |
| 3,815,357 A | | 6/1974 | Brennan |
| 3,897,001 A | | 7/1975 | Helmintoller, Jr. et al. |
| 3,964,257 A | * | 6/1976 | Lardellier ........... F04D 27/0215 60/226.1 |

(Continued)

FOREIGN PATENT DOCUMENTS

GB 1472033 A 4/1977

OTHER PUBLICATIONS

French Int'l Search Report dated Jun. 28, 2017 with English translation cover sheet.

*Primary Examiner* — Arun Goyal
*Assistant Examiner* — Henry Ng
(74) *Attorney, Agent, or Firm* — Womble Bond Dickinson (US) LLP

(57) ABSTRACT

Propulsion assembly comprising:
 an inner casing (13);
 an outer casing (3);
 an inter-duct casing (15) delimiting a primary duct (12) between the inner casing (13) and an outer wall (14), and a secondary duct (16) between the outer casing (3) and an outer wall (17);
 a fan capable of generating an air flow (24) circulating from downstream to upstream in the secondary duct (16);
the assembly further comprising:
 at least one duct (27) for bleeding air from said flow (24), this bleed duct (27) comprising an inlet port (28) in the outer wall (17) and an outlet port (29) in the inner wall (14);
 an outer flap (30) movable between an open position and a closed position of the inlet port (28);
 an inner flap (31) movable between an open position and a closed position of the outlet port (29).

4 Claims, 4 Drawing Sheets

(52) U.S. Cl.
CPC ............... *F02K 1/66* (2013.01); *F02K 3/075* (2013.01); *F04D 29/362* (2013.01); *B64D 27/16* (2013.01); *B64D 2033/0286* (2013.01); *F05D 2220/323* (2013.01); *F05D 2260/50* (2013.01)

(58) Field of Classification Search
CPC . B64D 27/16; B64D 2033/0286; F01D 9/065; F02C 7/042; F04D 29/362; F04D 27/0215; F05D 2220/323; F05D 2260/50
See application file for complete search history.

(56) References Cited

U.S. PATENT DOCUMENTS

| | | | | |
|---|---|---|---|---|
| 4,462,207 | A * | 7/1984 | Hitchcock | F02K 1/60 239/265.31 |
| 4,463,903 | A * | 8/1984 | Nightingale | F02K 1/36 239/265.17 |
| 5,119,625 | A | 6/1992 | Glowacki | |
| 5,611,489 | A * | 3/1997 | Berneuil | F02K 1/123 239/265.19 |
| 5,987,880 | A * | 11/1999 | Culbertson | F02K 1/70 239/265.37 |
| 6,293,494 | B1 * | 9/2001 | Scherer | B64D 33/02 244/53 B |
| 2013/0067884 | A1 | 3/2013 | Bhatt | |
| 2017/0218842 | A1 * | 8/2017 | Nestico | F04D 29/563 |
| 2017/0226960 | A1 * | 8/2017 | Nakano | F02K 1/766 |
| 2017/0284296 | A1 * | 10/2017 | Nestico | B64D 31/06 |
| 2017/0284297 | A1 * | 10/2017 | Nestico | F02K 3/075 |
| 2017/0284304 | A1 * | 10/2017 | Nestico | F02C 7/047 |

\* cited by examiner

PROPULSION ASSEMBLY COMPRISING A DUCT FOR FEEDING THE GAS GENERATOR IN AN INTER-DUCT CASING

TECHNICAL FIELD

The present invention relates to an aircraft propulsion assembly comprising a bypass turbojet engine having a fan provided with variable-pitch blades, and more specifically the feeding of a gas generator of the turbine engine when the propulsion assembly is operating in a mode known as reverse mode or reverse thrust mode.

PRIOR ART

A propulsion assembly comprises, for example, a bypass turbojet engine integrated into a nacelle, the turbine engine comprising, from upstream to downstream, at least one fan and a gas generator with, for example, one or more compressor stages, low pressure and high pressure, a combustion chamber, one or more turbine stages, high pressure then low pressure.

In an operating mode of the propulsion assembly known as propulsive mode, for example when the aircraft is cruising, the flow of air generated by the fan is divided, by a separator (or separation nozzle), into a primary air flow and a secondary air flow circulating from upstream to downstream. More specifically, the primary flow flows in an annular primary duct of the gas generator and the secondary flow flows in an annular secondary duct delimited radially between the gas generator and the nacelle, and making a predominant contribution to the thrust provided by the propulsion assembly.

By convention, in this application, the terms "upstream" and "downstream" are defined in relation to the direction of circulation of the gases in the propulsion assembly when the latter is operating in propulsive mode. Likewise, by convention in this application, the terms "inner" and "outer" are defined radially in relation to the longitudinal axis of the turbine engine, which is in particular the axis of rotation of the compressor rotors and of the turbine rotors.

In order to reduce the fuel consumption of the propulsion assembly, engine designers are continually seeking to increase the bypass ratio, commonly known by the abbreviation BPR, of the propulsion assembly, this ratio corresponding to the quotient of the air flow rate in the secondary duct and in the primary duct.

To achieve this aim, it is possible, in particular, to have a fan provided with blades of a variable pitch so as to adjust the pitch (and more specifically the angle of pitch) of the blades according to the flight parameters, and thus generally optimise the operation of the propulsion assembly.

In a mode of operation known as reverse mode, the fact of having variable-pitch blades also allows these blades to be used to generate a counter-thrust, and thus help to slow down the aircraft as a complement to the brakes so as to reduce its braking distance during landing.

Thus, in the propulsive mode of operation, the pitch of the fan vanes is positive, and in the reverse mode of operation, the pitch of the vanes is negative.

Unlike a fan provided with fixed-pitch blades which requires the addition of thrust reversers (for example pivoting-door thrust reversers and/or sliding cowls incorporated into the nacelle) to generate this counter-thrust during landing of the aircraft, a propulsion assembly with a fan provided with variable-pitch blades does not include thrust reversers in its structure, to the advantage of the weight of the propulsion assembly.

In reverse operating mode, the secondary flow circulates from downstream to upstream in the secondary duct, a first portion of the secondary flow being used to feed the primary duct, in which the air flow always circulates from upstream to downstream, of the gas generator, a second portion of the secondary flow flowing out of the propulsion assembly via the fan so as to generate a counter-thrust.

Through feedback, with reference to the first portion of the secondary flow entering the primary duct, it is noted that areas of separation of the air flow appear at the separation nozzle. These areas of separation significantly reduce the efficiency of the gas generator, and of the propulsion assembly in general. Depending on the engine speed used, these areas of separation may jeopardise the operation of the gas generator.

The prior art also includes documents US-A-3897001 and US-A-3476486.

The aim of the present invention is therefore to overcome the disadvantage stated above.

SUMMARY OF THE INVENTION

For that purpose, the invention proposes a propulsion assembly, in particular for an aircraft, comprising:
an inner annular casing;
an outer annular casing extending at least partially around the inner casing;
an annular inter-duct casing disposed between the inner casing and the outer casing so as to delimit an annular primary duct between the inner casing and an inner wall of the inter-duct casing, and an annular secondary duct between the outer casing and an outer wall of the inter-duct casing;
a fan surrounded by the outer casing and having variable-pitch vanes capable of generating an air flow circulating from downstream to upstream in the secondary duct;
characterised in that it further comprises:
at least one duct for bleeding said air flow to feed the primary duct, this bleed duct comprising an inlet port made in the outer wall and an outlet port made in the inner wall;
at least one outer flap movable between a position in which the inlet port is open and a position in which the inlet port is closed;
at least one inner flap movable between a position in which the outlet port is open and a position in which the outlet port is closed;
the inner and outer flaps being controlled by common means for controlling opening and closure.

The bleed duct associated with the inner and outer flaps not only allows the flow of the bled-off air to be optimised during its passage from the secondary duct to the primary duct but it also allows the appropriate air flow rate to be provided in the primary duct when the propulsion assembly is operating in reverse mode, to the advantage of the efficiency and lifespan of the propulsion assembly.

Control means of this kind are compact and allow the mass of the assembly to be minimised.

The propulsion assembly according to the invention may comprise one or more of the following features, taken separately from one another or in combination with one another:

the bleed duct comprises a system for directing said air flow;

the system for directing said air flow comprises at least one curved fin with a concavity turned in a downstream direction;

the inlet and outlet ports are made at an upstream extremity of the inter-duct casing, forming a nozzle for separating the primary and secondary ducts;

the bleed duct is delimited axially by curved partitions with a concavity turned in a downstream direction and connecting the inner and outer walls;

the inner and outer flaps are articulated around a common axis;

the common means comprise:
- a caliper system comprising inner and outer links, the upstream extremities of which are articulated in relation to one another around a common axis and the downstream extremities of which are each connected in rotation to the inner and outer flaps respectively;
- an actuation system;
- a transmission system connected in rotation to the actuation system and to the caliper system;

the transmission system comprises:
- inner and outer rods the downstream extremities of which are articulated in relation to one another around a common axis and the upstream extremities of which are each connected in rotation to the inner and outer links respectively;
- a first lever articulated about a axis fixed in relation to the inter-duct casing, the first lever having a downstream extremity connected in rotation to the actuation system and an upstream extremity connected in rotation to a transmission unit;
- a second lever articulated about a axis fixed in relation to the inter-duct casing, the second lever comprising an oblong hole into which a pin of the unit is inserted;
- an arm having a downstream extremity connected in rotation to the second lever and an upstream extremity connected in rotation to each of the downstream extremities of the rods.

DESCRIPTION OF THE FIGURES

The invention will be better understood and other details, features and advantages of the invention will become more clearly apparent on reading the description that follows, given as a non-restrictive example and with reference to the accompanying drawings in which.

DETAILED DESCRIPTION

Figure 1:
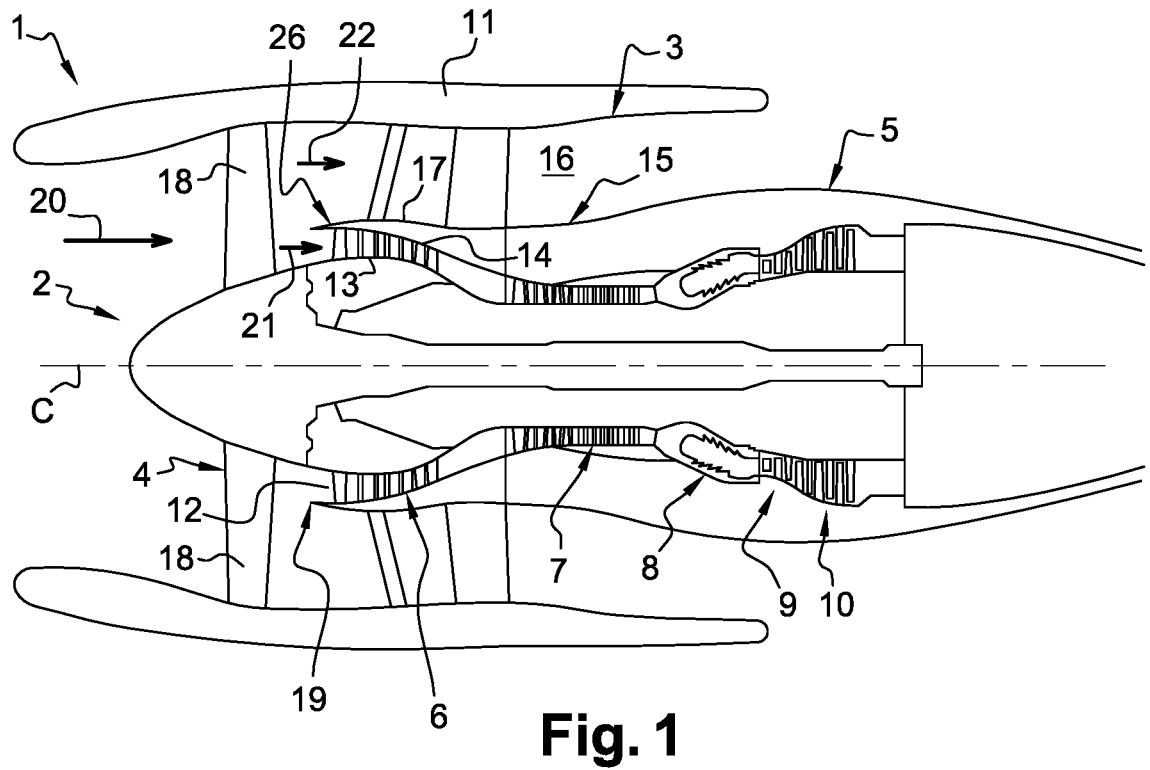
FIG. 1 is a diagrammatic view, in longitudinal cross section, of a propulsion assembly operating in a mode known as propulsive mode.

FIG. 1 shows a propulsion assembly 1, in particular for an aircraft, comprising a bypass turbojet engine 2 integrated into an annular outer casing 3, the turbine engine 2 comprising, from upstream to downstream, a fan 4 and a gas generator 5 with a plurality of compressor stages, low pressure 6 and high pressure 7, a combustion chamber 8, and a plurality of turbine stages, high pressure 9 then low pressure 10.

In the present instance, the outer casing 3 comprises in particular a fan casing, an intermediate casing and a nacelle 11.

The propulsion assembly 1 further comprises, firstly, an annular primary duct 12 of the gas generator 5, said duct being delimited radially between an inner annular casing 13 of the movable rotors of the turbine engine 2 and an inner wall 14 of an annular inter-duct casing 15, with axis of revolution C, disposed between the inner casing 13 and the outer casing 3, and secondly, an annular secondary duct 16 delimited radially between an outer wall 17 of the inter-duct casing 15 and the outer casing 3.

The axis of revolution C of the inter-duct casing 15 is merged with the longitudinal axis of the turbine engine 2, which is, in particular, the axis of rotation of the rotors of the fan 4, of the compressors 6, 7 and of the turbines 9, 10.

In the remainder of the description, the air flows circulating in the primary and secondary ducts 12, 16 are called the primary flow and secondary flow respectively.

The fan 4 is surrounded by the outer casing 3 and has variable-pitch vanes 18. The pitch of a vane is measured via the angle of pitch which corresponds to the angle, in a longitudinal plane, between the chord of the vane 18 and the plane of rotation of the fan 4.

FIG. 1 shows the propulsion assembly 1 operating in propulsive mode. The angle of pitch of the vanes 18 of the fan 4 is positive, the primary and secondary flows 21, 22 generating a positive thrust, that is to say a thrust of which the axial resultant is oriented from downstream to upstream.

More specifically, as shown in FIG. 1, the air flow 20 generated by the fan 4 (circulating from upstream to downstream) is divided, by a separator nozzle 19 of the inter-duct casing 15 separating the primary and secondary ducts 12, 16, into a primary air flow 21 and a secondary air flow 22 circulating from upstream to downstream, the secondary flow 22 making a predominant contribution to the thrust provided by the propulsion assembly 1. This mode of operation is used, for example, when the aircraft is in a take-off and/or cruise phase.

Figure 2:
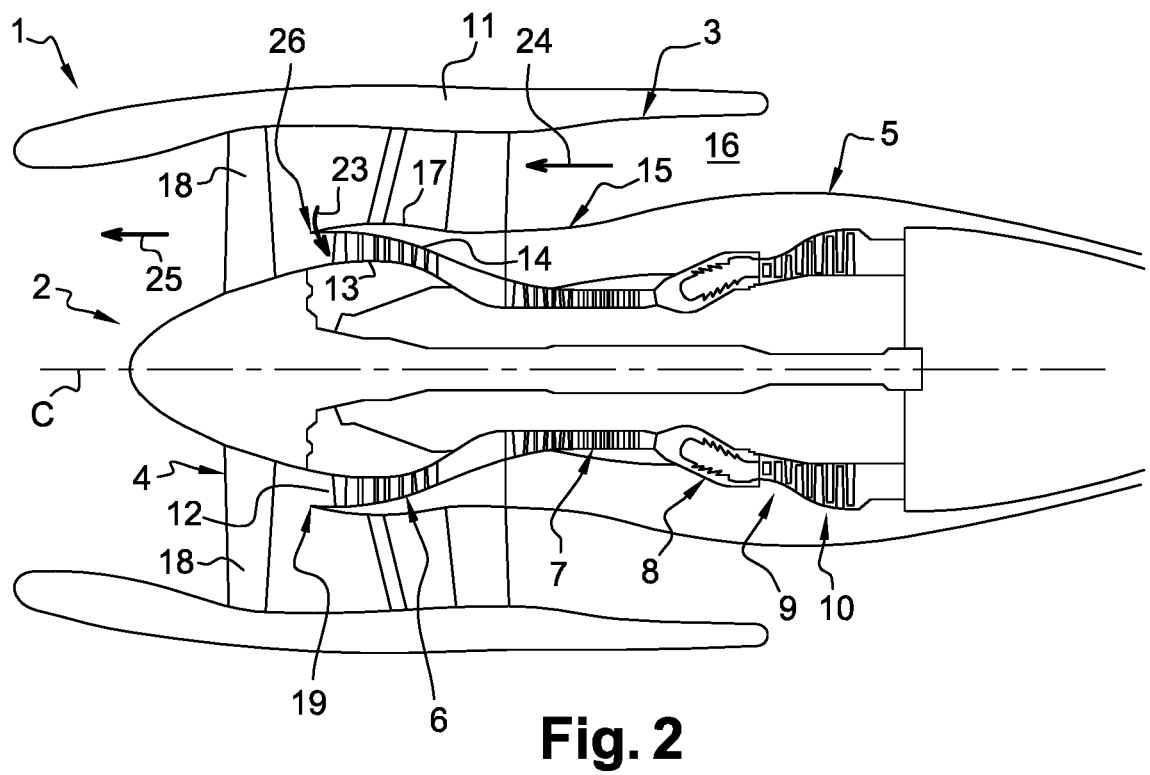
FIG. 2 is a diagrammatic view, in longitudinal cross section, of the propulsion assembly operating in a mode known as reverse mode.

FIG. 2 shows the propulsion assembly 1 operating in reverse (or reverse thrust) mode. The angle of pitch of the vanes 18 of the fan 4 is negative, a portion 25 of the secondary flow 24 flowing out from the fan 4 so as to generate a negative thrust (or counter-thrust), that is to say, a thrust of which the axial resultant is oriented from upstream to downstream.

More specifically, as shown in FIG. 2, the fan 4 generates a secondary air flow 24 circulating from downstream to upstream in the secondary duct 16. A first portion 23 of the secondary flow 24 is used to feed the primary duct 12, in which the primary air flow always circulates from upstream to downstream, of the gas generator 5. A second portion 25 of the secondary flow 24 flows out of the propulsion assembly 1 via the fan 4 so as to generate negative thrust, and thus to help slow down the aircraft as a complement to the brakes so as to reduce its braking distance during landing.

The propulsion assembly 1 comprises a bleed system 26 comprising at least one duct 27 for bleeding air from the secondary air flow 24 (circulating from downstream to upstream) to feed the primary duct 12 when the propulsion assembly 1 is operating in reverse mode. The bleed duct 27 comprises an inlet port 28 made in the outer wall 17 and an outlet port 29 made in the inner wall 14.

The bleed system 26 further comprises, firstly, at least one outer flap 30 movable (for example in translation or in rotation) between an open position (FIGS. 5 and 6) of the inlet port 28 and a closed position (FIGS. 3, 4 and 7) of the inlet port 28, and, secondly, at least one inner flap 31 movable (for example in translation or in rotation) between an open position (FIGS. 5 and 6) of the outlet port 29 and a closed position (FIGS. 3, 4 and 7) of the outlet port 29.

Thus, when the propulsion assembly 1 is operating in propulsive mode, the inner and outer flaps 31, 30 are in a closed position, and in other words, flush with the peripheral edges of the inlet and outlet ports 28, 29 respectively, so as to provide an aerodynamic continuity and thus avoid disrupting the flow of the primary and secondary flows 21, 22.

When the propulsion assembly 1 is operating in reverse mode, the inner and outer flaps 31, 30 are in an open position, and in other words the inner and outer flaps 31, 30 are angularly distanced from the peripheral edges of the inlet and outlet ports 28, 29 so as to bleed off the first portion 23 of the secondary flow 24, said first portion being used to feed the primary duct 12 of the gas generator 5. The first portion 23 of the secondary flow 24 is thus diverted by approximately 180 degrees, passing successively through the inlet port 28, the bleed duct 27 then the outlet port 29, to reach the primary duct 12.

The number of inlet and outlet ports 28, 29, the geometric and dimensional features of the inlet and outlet ports 28, 29, and the angular position of the flaps 30, 31 are parameters that are predetermined in order to provide the appropriate air flow rate to the gas generator 5 when the propulsion assembly 1 is operating in reverse mode.

According to the embodiments shown in the figures, the flaps 30, 31 are substantially circular and of a shape complementary to the respective ports 28, 29. Advantageously, in order to minimise the pressure losses, the flaps 30, 31 and/or the edges of the ports 28, 29 comprise sealing means.

Figure 6:
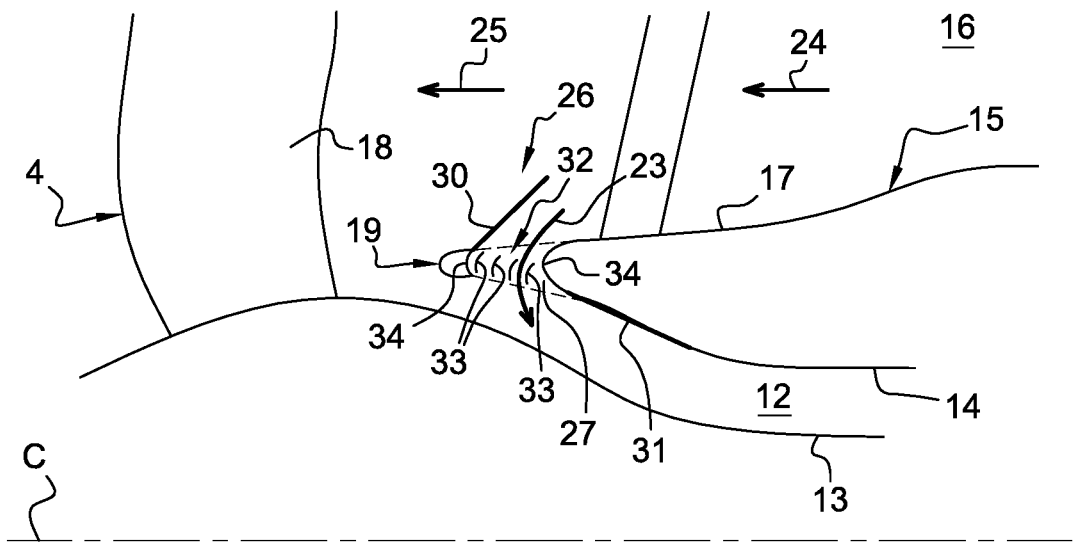
FIG. 6 is a detailed diagrammatic view, in longitudinal half-section, of a variant of the bleed system, with the flaps in an open position.
Figure 7:
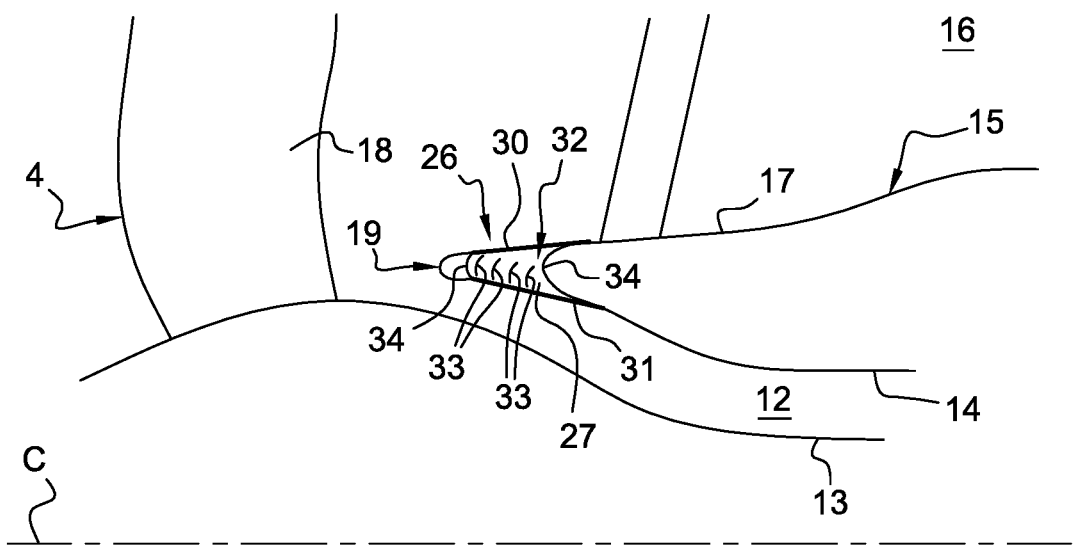
FIG. 7 is a detailed diagrammatic view, in longitudinal half-section, of the variant of the bleed system shown in FIG. 6, with the flaps in a closed position.

Advantageously, to prevent any flow separation of the first portion 23 of the secondary flow 24 when it is diverted, the bleed duct 27 comprises a system 32 for directing the flow of bleed air. The flow direction system 32 comprises for example a plurality of circular fins 33, each fin 33 being, in longitudinal cross section, curved with a concavity turned in a downstream direction (FIGS. 6 and 7). The fins 33 are for example disposed axially behind one another.

According to the embodiments shown in the figures, the inlet and outlet ports 28, 29 are made at an upstream extremity of the inter-duct casing 15, said upstream extremity forming the nozzle 19 for separating the primary and secondary ducts 12, 16.

The bleed system 26 may comprise a single annular bleed duct 27 (axis of revolution C). In a variant, the bleed system 26 may comprise a sectorised bleed duct 27 comprising a plurality of duct sectors distributed angularly around the axis C, the different sectors being angularly adjoining one another or angularly distanced from one another, by a regular or irregular interval.

Advantageously, as shown in the figures, each bleed duct 27 is delimited axially by curved partitions 34 with a concavity turned in a downstream direction and connecting the inner and outer walls 14, 17, so as to facilitate the flow of the fluid in the bleed duct 27.

The inlet port 28 of a bleed duct 27 is associated with one or more outer flaps 30, this outer flap or these outer flaps 30 being controlled by means 35 for controlling opening and closure. In the same way, the outlet port 29 of a bleed duct 27 is associated with one or more inner flaps 31, this inner flap or these inner flaps 31 being controlled by means 35 for controlling opening and closure.

Figure 3:
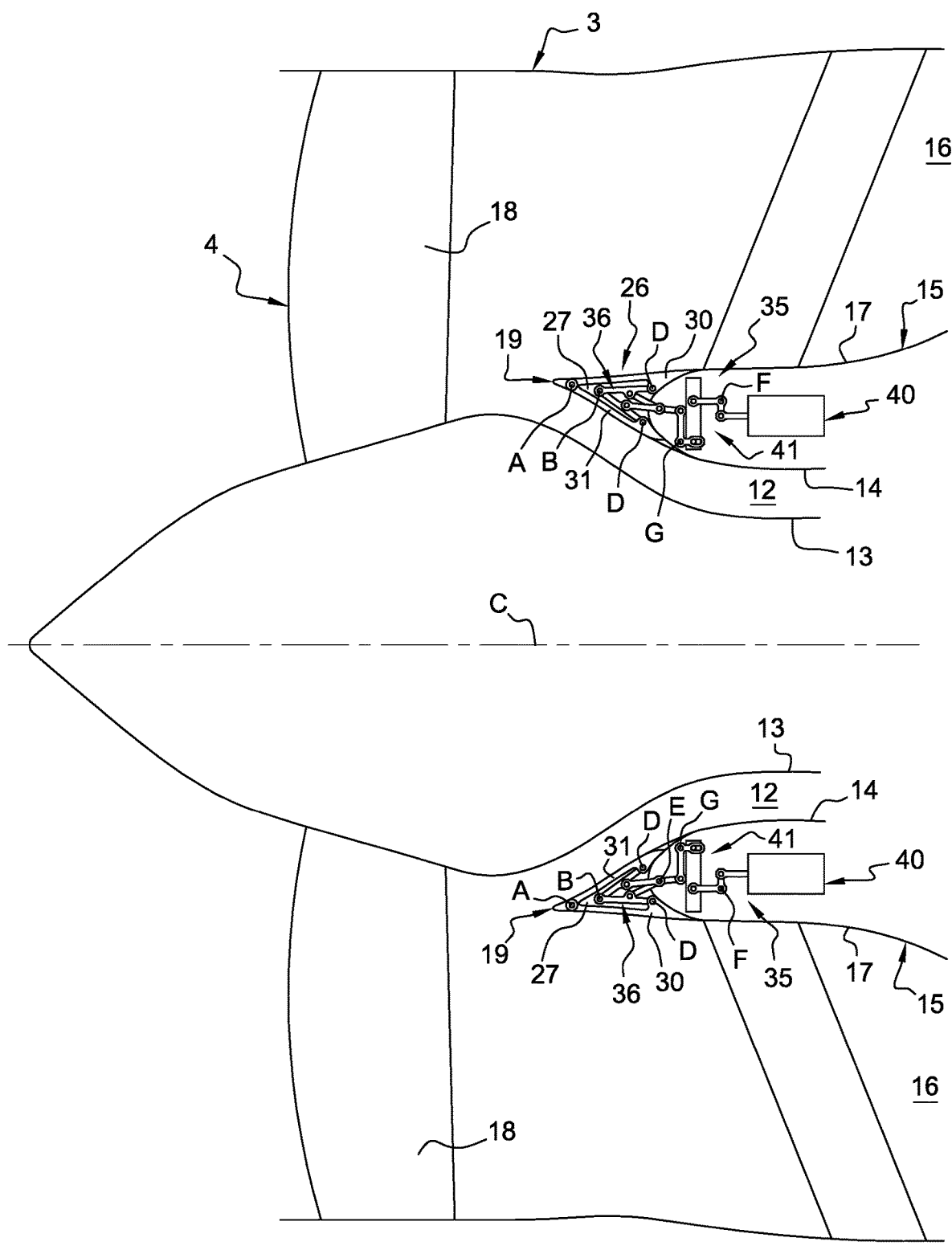
FIG. 3 is a diagrammatic view, in longitudinal cross section, of a bleed system of the propulsion assembly, this system having inner and outer flaps in a closed position.
Figure 4:
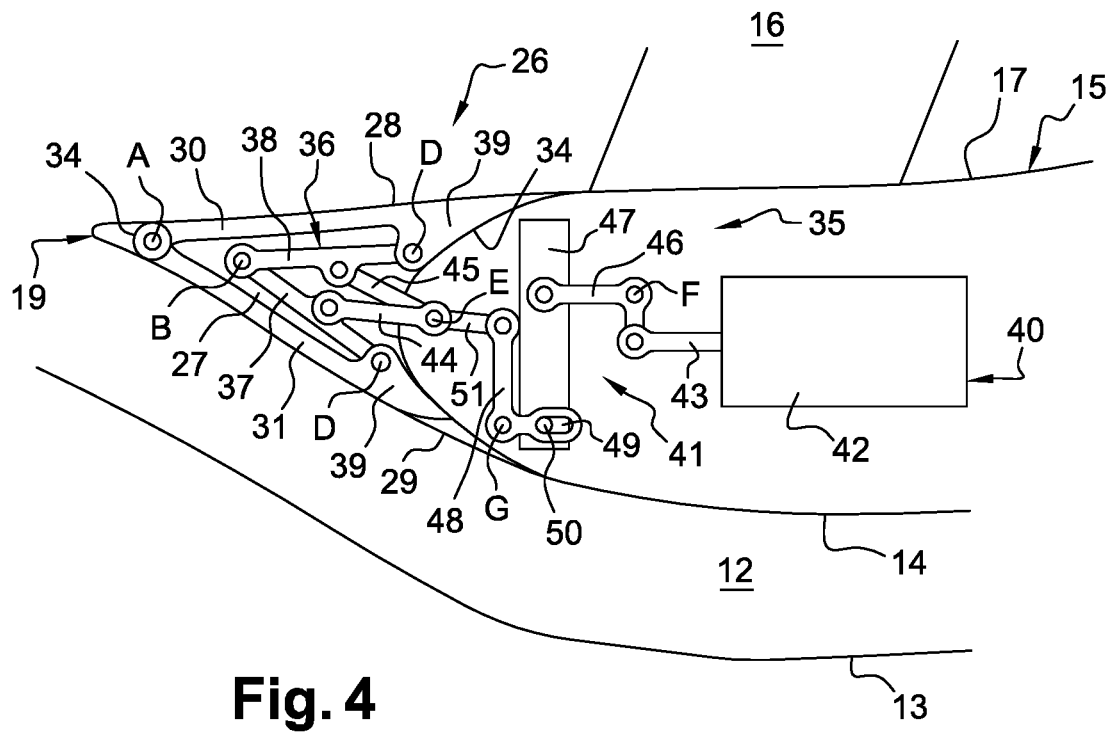
FIG. 4 is a detailed view, in longitudinal half-section, of the bleed system of FIG. 3.
Figure 5:
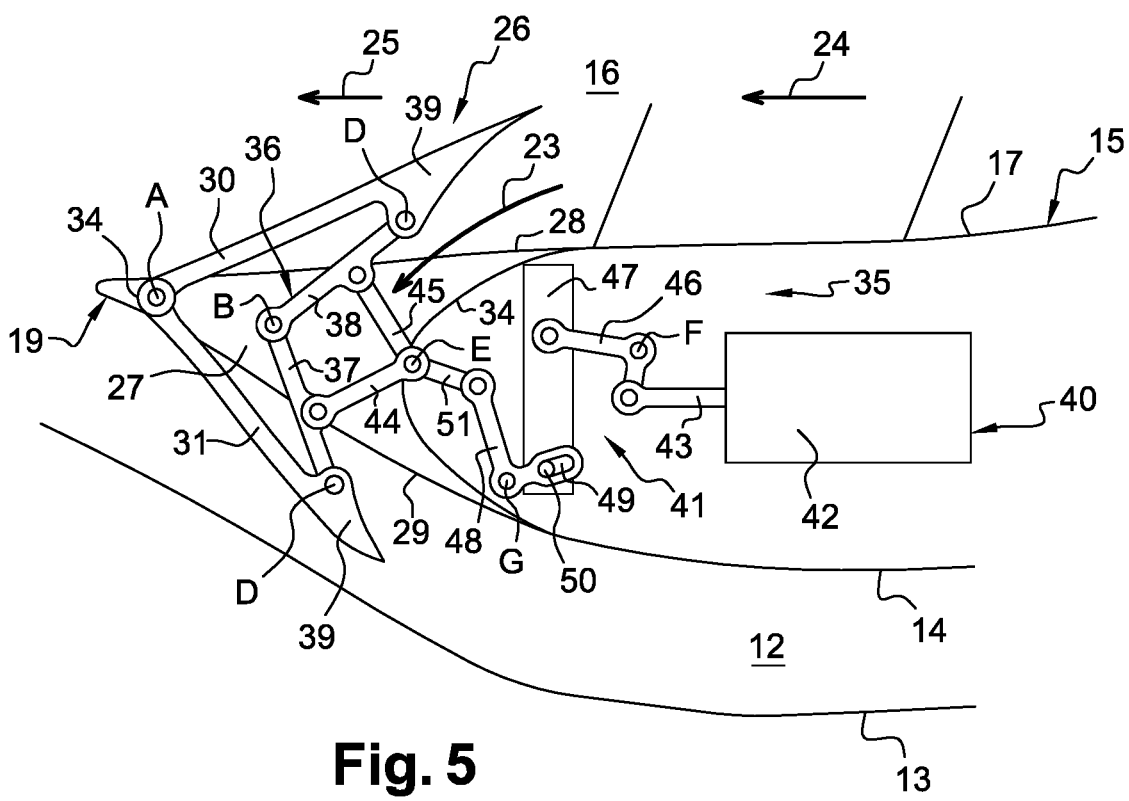
FIG. 5 is a detailed diagrammatic view, in longitudinal half-section, of the bleed system with the flaps in an open position.

According to the embodiment shown in FIGS. 3 to 5, a pair of flaps of a bleed duct 27, namely an inner flap 31 and an outer flap 30 facing one another, is articulated, at an upstream extremity, around a common (circular) axis A fixed in relation to the inter-duct casing 15. The pair of flaps 30, 31 is controlled by common means 35 for controlling opening and closure. The flaps 30, 31 open from downstream to upstream in such a way as to facilitate the inflow and outflow of the first portion 23 of the secondary flow 24. This is because, in an open position, the outer flap 30 opposes the flow of the secondary flow 24 so as to direct the first portion 23 towards the corresponding bleed duct 27.

More specifically, the common means 35 comprises a caliper system 36 comprising inner and outer links 37, 38, of identical length. Upstream extremities of the links 37, 38 are articulated relative to one another around a common axis B, while downstream extremities of the links are each connected in rotation respectively to the inner and outer flaps 31, 30, around an anchoring axis D formed in a lug 39 projecting at a downstream extremity of the corresponding flap 31, 30.

The links 37, 38 and the flaps 31, 30 form a mechanism known as a double triangulation mechanism that in longitudinal half-section has a double chevron shape. The inner and outer links 37, 38 thus face the inner and outer flaps 31, 30 respectively.

The caliper 36 system allows the opening and closure of the inner and outer flaps 31, 30 to be synchronised.

The movement to open (or close) the flaps 30, 31 is initiated by means of an actuation system 40. The movement to open (or close) is transmitted to the flaps 30, 31 by means of a transmission system 41 connected in rotation to the actuation system 40 and to the caliper system 36.

According to the embodiment shown in FIGS. 3 to 5, the actuation system 40 is a linear actuator, such as a cylinder. It comprises in particular a body 42 fixed in relation to the inner-duct casing 15 and a spindle 43 movable in axial translation relative to the body 42.

The transmission system 41 comprises inner and outer rods 44, 45, of identical length. Downstream extremities of the rods 44, 45 are articulated in relation to one another around a common axis E, while upstream extremities of the rods 44, 45 are each connected in rotation respectively to the inner and outer links 37, 38, at approximately mid-length.

The transmission system 41 further comprises, firstly, a first lever 46 and a second lever 48. The first lever 46 is articulated around a axis F fixed in relation to the inter-duct casing 15, and has a downstream extremity connected in rotation to the spindle 43 of the linear actuator and an upstream extremity connected in rotation to a transmission unit 47. The second lever 48 is articulated around a axis G fixed in relation to the inter-duct casing 15. The second lever 48 comprises, at a downstream extremity, an oblong hole 49 into which a pin 50 of the unit 47 is inserted. The levers 46, 48 each have the shape, in longitudinal half-section, of a bracket, the articulation axis F, G of the levers 46, 48 being situated at the right angles.

The transmission system 41 also comprises a transmission arm 51. The transmission arm 51 has a downstream extremity connected in rotation to an upstream extremity of the second lever 48, and an upstream extremity connected in rotation to each of the downstream extremities of the rods 44, 45.

The opening (or closure) movement initiated by the actuation system 40 is transmitted to the inner and outer flaps 31, 30, successively, by the first lever 46 (by rotation about the axis F), the transmission unit 47 (by curvilinear translation), the second lever 48 (by rotation about the axis G), the arm 51, the rods 44, 45 and the links 37, 38.

Advantageously, a plurality of pairs of flaps 30, 31 are connected to a circular transmission unit 47 (axis of revolution C), so as to minimise the number of actuation systems 40. The unit 47 thus comprises a pin 50 for each pair of flaps 31, 30 to be controlled. Each pair of flaps 31, 30 is connected to the corresponding pin 50 by an assembly comprising a caliper mechanism (provided with inner and outer links 37, 38), inner and outer rods 44, 45, an arm 51 and a second lever 48.

Advantageously, in the situation where the flaps 30, 31 of one pair are of a large size, this pair is controlled via a plurality of caliper mechanisms distributed angularly in a regular manner around the axis C, these different caliper mechanisms being driven by a common circular unit 47 with axis of revolution C.

According to the embodiment shown in FIGS. 6 and 7, the bleed system 26 comprises an outer flap 30 movable in rotation relative to the outer wall 17, at an upstream extremity, around a axis fixed in relation to the inter-duct casing 15. The bleed system also comprises an inner flap 31 movable in translation relative to the inner wall 14. The flaps 30, 31 are movable between an open position (FIG. 6) and a closed position (FIG. 7).

The invention claimed is:

1. A propulsion assembly, in particular for an aircraft, comprising:
    an annular inner casing;
    an annular outer casing extending at least partially around the inner casing;
    an annular inter-duct casing disposed between the inner casing and the outer casing so as to delimit an annular primary duct between the inner casing and an inner wall of the inter-duct casing, and an annular secondary duct between the outer casing and an outer wall of the inter-duct casing;
    a fan surrounded by the outer casing and having variable-pitch vanes capable of generating an air flow circulating from downstream to upstream in the secondary duct; characterised in that it further comprises:
    at least one bleed duct for bleeding said air flow to feed the primary duct, the at least one bleed duct comprising an inlet port made in the outer wall and an outlet port made in the inner wall;
    at least one outer flap movable between a position in which the inlet port is open and a position in which the inlet port is closed;
    at least one inner flap movable between a position in which the outlet port is open and a position in which the outlet port is closed;
    the at least one inner flap and the at least one outer flap being controlled by common means for controlling opening and closure;
    the at least one inner flap and the at least one outer flap being articulated around a first common axis, wherein the at least one inner flap and the at least one outer flap are joined at said first common axis to be rotatable around said first common axis;
    wherein the common means comprise:
    a caliper system comprising an inner link and an outer link, the upstream extremities of which are articulated in relation to one another around a second common axis and the downstream extremities of which are each connected in rotation to the at least one inner flap and the at least one outer flap respectively;
    an actuation system;
    a transmission system connected in rotation to the actuation system and to the caliper system;
    wherein the transmission system comprises:
    an inner rod and an outer rod, the downstream extremities of which are articulated in relation to one another around a third common axis and the upstream extremities of which are each connected in rotation to the inner link and the outer link respectively;
    a first lever articulated about a fourth axis fixed in relation to the inter-duct casing, the first lever having a downstream extremity connected in rotation to the actuation system and an upstream extremity connected in rotation to a transmission unit;
    a second lever articulated about a fifth axis fixed in relation to the inter-duct casing, the second lever comprising an oblong hole into which a pin of the transmission unit is inserted;
    an arm having a downstream extremity connected in rotation to the second lever and an upstream extremity connected in rotation to each of the downstream extremities of the inner rod and the outer rod.

2. The propulsion assembly according to claim 1, characterised in that the inlet port and the outlet port are made at an upstream extremity of the inter-duct casing, forming a nozzle for separating the primary duct and the secondary duct.

3. The propulsion assembly according to claim 1, characterised in that the at least one bleed duct is delimited axially by curved partitions with a concavity turned in a downstream direction and connecting the inner wall and the outer wall.

4. The propulsion assembly according to claim 1, characterised in that said first common axis is fixed in relation to the inter-duct casing when the at least one inner flap and the at least one outer flap rotate.

* * * * *